US 6,472,782 B1

(12) United States Patent
Selci

(10) Patent No.: US 6,472,782 B1
(45) Date of Patent: Oct. 29, 2002

(54) DRIVE SPINDLE WITH TWO-STAGE STATIC DEFLECTOR

(75) Inventor: Giancarlo Selci, Pesaro (IT)

(73) Assignee: H.S.D. S.r.l. (IT)

( * ) Notice: Subject to any disclaimer, the term of this patent is extended or adjusted under 35 U.S.C. 154(b) by 0 days.

(21) Appl. No.: 09/606,917

(22) Filed: Jun. 29, 2000

(30) Foreign Application Priority Data

Jun. 30, 1999 (IT) .......................... BO99A0359

(51) Int. Cl.⁷ ............... H02K 9/00; H02K 9/06; H02K 1/32
(52) U.S. Cl. ............... 310/63; 310/61; 310/62; 310/58; 310/60
(58) Field of Search ............... 310/52, 53, 58, 310/60 A, 62, 64, 89

(56) References Cited

U.S. PATENT DOCUMENTS

| 2,494,200 A | * | 1/1950 | Ramqvist | 310/52 |
| 2,697,179 A | * | 12/1954 | Wendel | 310/62 |
| 2,970,234 A | * | 1/1961 | Erickson | 310/61 |
| 3,226,580 A | * | 12/1965 | Oehlrich et al. | 310/254 |
| 3,882,335 A | * | 5/1975 | Fries | 310/61 |
| 4,074,156 A | * | 2/1978 | Widstrand et al. | 310/62 |
| 4,250,417 A | | 2/1981 | Arnold | 310/62 |
| 4,465,948 A | * | 8/1984 | Oyama et al. | 310/62 |
| 4,680,493 A | * | 7/1987 | Ziegler et al. | 310/62 |
| 5,019,737 A | | 5/1991 | Bruno | 310/89 |
| 5,311,089 A | * | 5/1994 | Stroetgen et al. | 310/50 |
| 5,632,578 A | * | 5/1997 | McCurry et al. | 409/136 |
| 5,894,178 A | * | 4/1999 | Stefan | 310/61 |
| 5,905,318 A | | 5/1999 | Faulhaber et al. | 310/58 |
| 5,925,960 A | * | 7/1999 | Hayes | 310/211 |
| 6,342,741 B1 | * | 1/2002 | Fukui et al. | 310/60 A |
| 6,346,755 B1 | * | 2/2002 | Tong et al. | 310/216 |

FOREIGN PATENT DOCUMENTS

| EP | 0878896 A | 11/1998 |
| FR | 515562 A | 4/1921 |
| FR | 2500776 A | 9/1982 |
| GB | 2319669 A | 2/1998 |
| JP | 06327185 A | 11/1994 |

* cited by examiner

Primary Examiner—Nestor Ramirez
Assistant Examiner—Pedro J. Cuevas
(74) Attorney, Agent, or Firm—Mayer, Brown, Rowe & Maw

(57) ABSTRACT

A drive spindle is provided with an electric motor, an output shaft of which defines a tool-bearing spindle rotatable about a longitudinal axis, and with a cooling device for the electric motor; the cooling device having an impeller mounted for rotation about the longitudinal axis of the spindle so as to generate a substantially helical airflow coaxial of the spindle itself, and a static deflector for directing the airflow from the impeller towards the electric motor along a direction substantially parallel to the longitudinal axis of the spindle.

11 Claims, 2 Drawing Sheets

DRIVE SPINDLE WITH TWO-STAGE STATIC DEFLECTOR

The present invention relates to a drive spindle.

In the field of machine tools, it is known to use a drive spindle which includes a tubular casing; an electric motor with an output shaft coaxial with the tubular casing and defining a tool-bearing spindle; and means for cooling the electric motor which include an impeller coaxial with the casing. The said cooling means and the motor are housed inside the tubular casing and the impeller is operable to impart to the air inside the tubular casing a substantially helical motion along the said tubular casing.

BACKGROUND OF THE INVENTION

The prior art cooling device of the type described is not very effective since, owing to its helical motion, the airflow generated by the associated impeller has a relatively small axial component and thus remains for a relatively long time inside the said tubular casing and in contact with the electric motor to be cooled.

SUMMARY OF THE INVENTION

The object of the present invention is to provide a drive spindle which is free of the disadvantages described above.

This object is achieved according to the present invention by providing a drive spindle which includes a tubular casing; an electric motor with an output shaft coaxial with the said tubular casing and defining a tool-bearing spindle; and means for cooling the said motor which include an impeller coaxial with the said tubular casing; the said cooling means and the said motor being housed inside the said tubular casing and the said impeller being operable to impart to the air within the tubular casing a first substantially helical motion along the said tubular casing; characterised in that the said cooling means also include a static deflector able gradually to turn the said helical motion into a substantially axial motion along the said tubular casing.

By transforming the helical motion of the air into a substantially axial motion along the tubular casing, the drive spindle of the invention enables a greater air pressure to be generated upstream of the electric motor to be cooled and a greater volume of air to be in contact with the electric motor.

BRIEF DESCRIPTION OF THE DRAWINGS

The present invention will now be described with reference to the appended drawings, which illustrate one embodiment thereof by way of non-limitative example, in which.

DETAILED DESCRIPTION OF THE INVENTION

Figure 1:
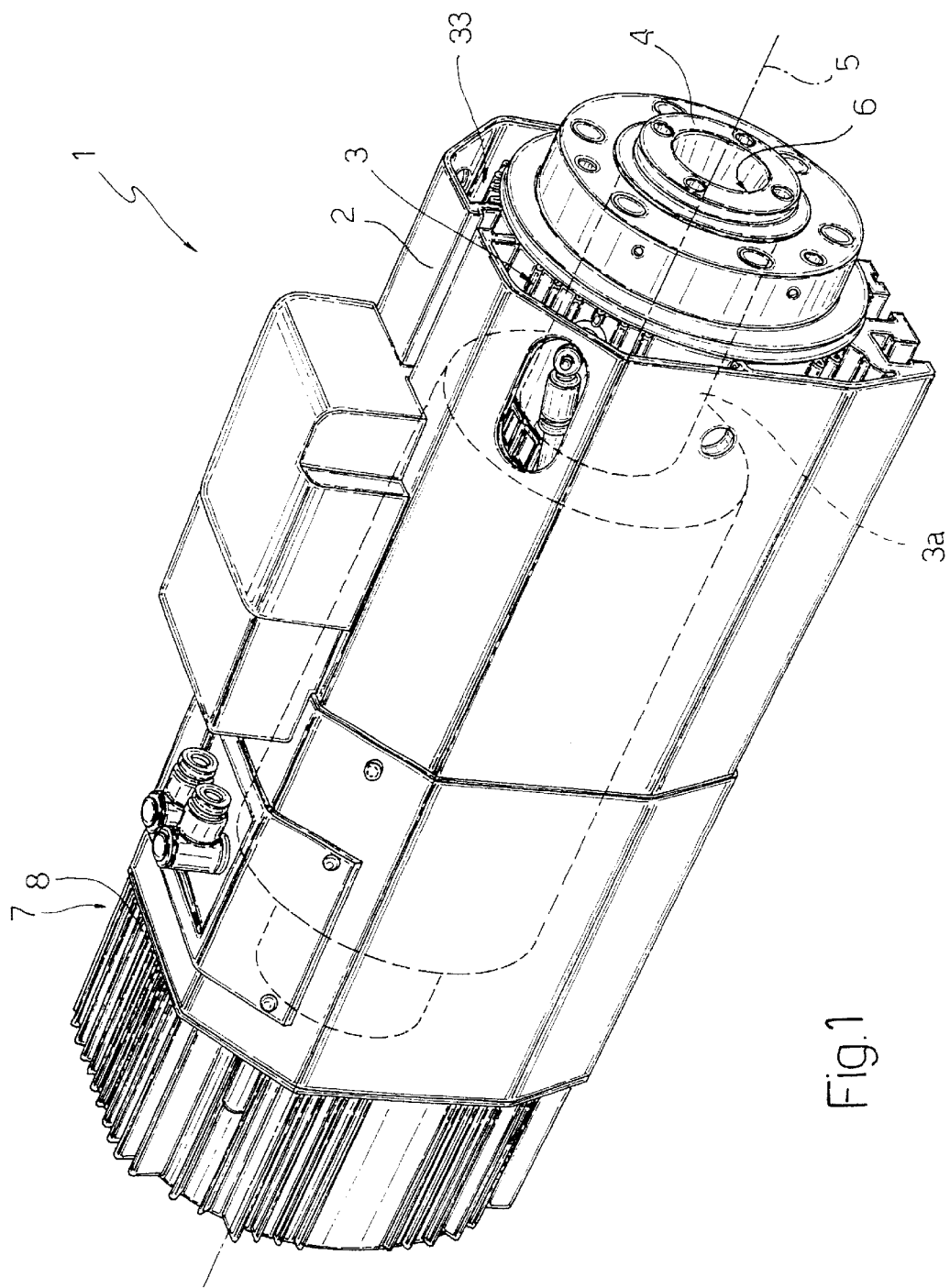
FIG. 1 is a perspective view of a preferred embodiment of the drive spindle of the present invention.

With reference to FIG. 1, a drive spindle is generally indicated 1 which includes a tubular casing 2 housing within it an electric motor 3 of a known type, which includes a rotor keyed to an output shaft 3a, a portion of the free end of which forms a tool-bearing spindle 4 rotatable about a longitudinal axis 5 coaxial with the shaft 3a.

The spindle 4 projects from the casing 2 and has a tapered axial hole 6 for housing, centering and retaining, by means of a taper coupling, the tapered shank (not illustrated) of an associated tool which is known and thus not shown.

Figure 2:
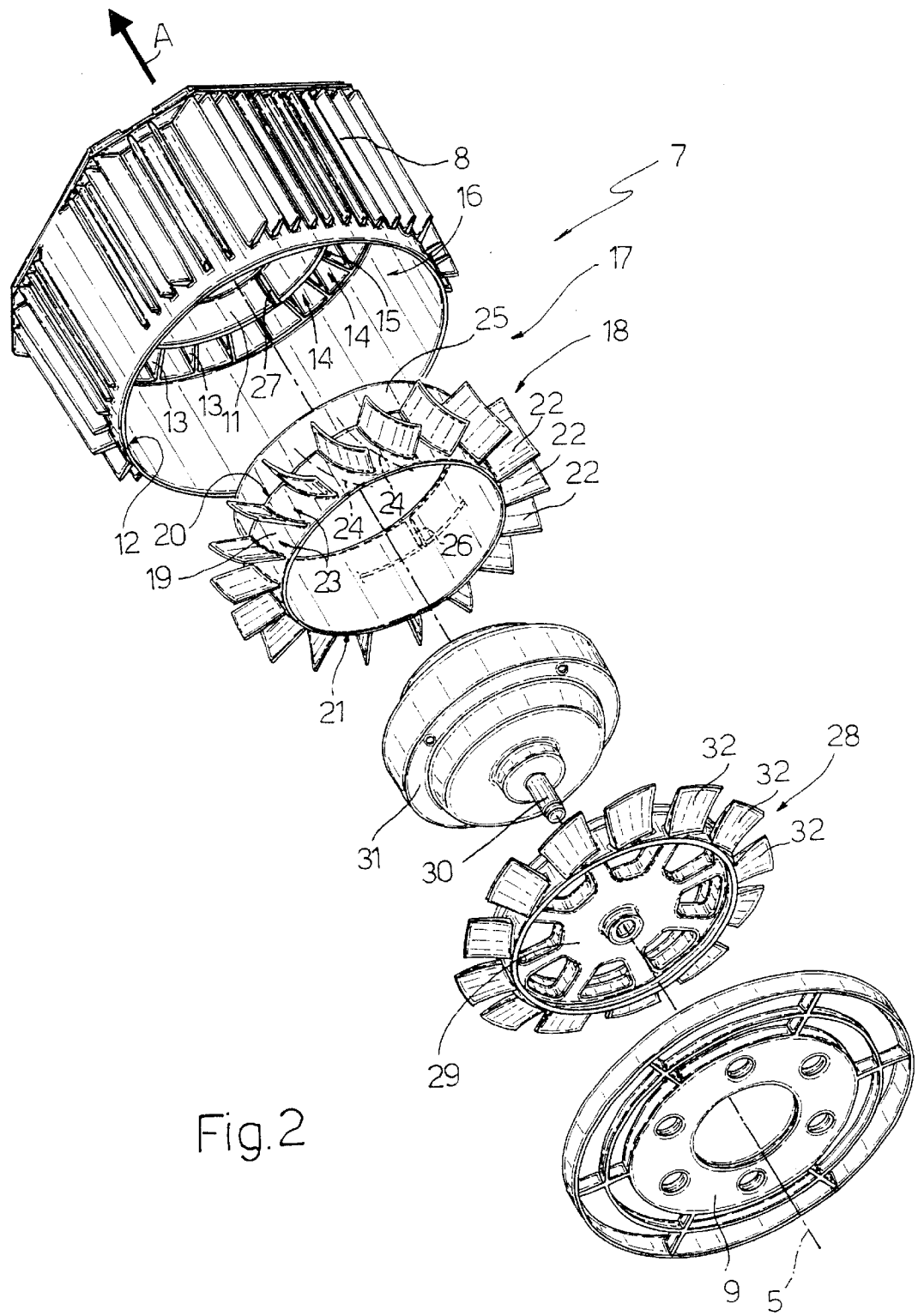
FIG. 2 is an exploded perspective view of a detail of FIG. 1.

The drive spindle 1 also includes a cooling device 7 for providing an airflow to carry away the heat produced by the motor 3 during operation. As illustrated in FIG. 2, the cooling device 7 includes a portion 8 of the casing 2 at the far end from the spindle 4 and closed, at its free end, by a cover 9 perpendicular to the axis 5.

A collar 11 coaxial with the axis 5 is housed inside an end part of the portion 8 of the casing 2 facing the motor 3, securely fixed to an inner surface 12 of the portion 8 of the casing 2 by means of a plurality of radial blades or walls 13. The walls 13 extend parallel to the axis 5 and are uniformly spaced around this axis 5 so as to define a plurality of fixed axial channels 14 which are uniformly distributed about the axis 5 and along the surface 12. The walls 13 have a first end facing the motor 3 and a second end, opposite the first, located against an annular end surface 15 of the collar 11, lying in a plane perpendicular to the axis 5.

The assembly formed by the end part of the portion 8 of the casing 2, the blades 13 and the collar 11 constitutes one stage 16 of a two-stage static deflector 17, of which the other stage, indicated 18, includes, in addition to the portion 8 of the casing 2, a tubular body 19 disposed within the portion 8 of the casing 2 in a position coaxial with the axis 5. The tubular body 19 is limited axially by two annular surfaces 20 and 21, substantially perpendicular to the axis 5, with the outer radius of the surface 20 being equal to the outer radius of the surface 15 and the surface 20 being arranged in contact with the said surface 15. Finally, the stage 18 also includes a plurality of walls or blades 22 which project outwardly from the tubular body 19, are uniformly spaced around the axis 5 and are curved so as to define between them a plurality of channels 23, between the portion 8 of the casing 2 and the outer surface of the tubular body 19, these being as many as the channels 14 and slightly offset with respect to the said channels 14 about the axis 5. Each channel 23 has an axis 24 with an exit portion, facing the motor 3, orientated substantially axially with respect to the casing 2, and an intake portion which is inclined to the axis 5 and substantially extends, as will be explained more clearly later, along a helix coaxial with the axis 5.

The tubular body 19 has a cylindrical tubular sleeve 25 which projects from the surface 20 coaxially of the axis 5 and slidably engages the collar 11, to which the sleeve 25 is fixed against rotation thanks to an axial tooth 26, projecting radially from the sleeve 25, which engages in a respective notch 27 formed in the inner surface of the collar 11.

It should also be pointed out that the sleeve 25 is axially fixed within the collar 11, preferably by gluing.

The cooling device 7 finally includes a known impeller 28 which is coaxial with the axis 5 and has a central hub 29 keyed to the output shaft 30 of an electric motor 31 of known type fixed both axially and against rotation within the sleeve 25 and the tubular body 19. The impeller 28 includes a plurality of blades 32 projecting outwardly from the hub 29, uniformly distributed about the axis 5 and operable, when the impeller 28 is rotated by the motor 31, to generate a helical airflow coaxial with the axis 5, along the casing 2 towards the motor 3 and substantially parallel to the intake portion 24 of each channel 23.

In use, the motor 31 of the cooling device 7 is operated to rotate the impeller 28 about the axis 5, causing the impeller 28 to generate a cooling airflow which substantially follows the said helical pattern. Given the direction in which it is moving along the casing 2 towards the motor 3, this airflow enters the channels 23 without a substantial pressure drop and is gradually deflected, flowing through the channels 23 and 14 so as to advance along a direction A, substantially parallel to the axis 5 while, at the same time, taking on the characteristics of a laminar flow. In this way, while substantially maintaining the speed imparted by the blades 32 of the impeller 28, the deflected airflow can pass through a tubular cavity 33, defined externally by the casing 2 and internally by the outer casing of the motor 3, thereby optimizing the heat exchange between the motor 3 and the cooling air.

In a variant which is not illustrated, the stage 18 of the static deflector 17 is arranged upstream of the impeller 28 along the direction A.

What is claimed is:

1. A drive spindle comprising:
   a tubular casing (2);
   an electric motor (3) with an output shaft (3a) coaxial with the said tubular casing (2) and defining a tool-bearing spindle; and
   a cooling means (7) for the said motor (3) comprising an impeller (28) coaxial with the said tubular casing (2) and a two-stage static deflector (17), the said cooling means (7) and the said motor (3) being housed within the said tubular casing (2) with the said cooling means (7) arranged upstream of the said motor (3); and
   wherein the said impeller is operable to impart to the air inside the said tubular casing (2) a first substantially helical motion along the tubular casing (2) and the said static deflector (17) is operable for gradually transforming the said helical motion into a substantially axial motion along the said tubular casing (2).

2. A drive spindle according to claim 1, wherein the said static deflector (17) is arranged within the said tubular casing (2) between the said impeller (28) and the said motor (3).

3. A drive spindle according to claim 1, wherein the said static deflector (17) comprises a tubular body (19) and a plurality of blades (22) uniformly distributed around the said tubular body (19) and defining with the said tubular casing (2) a plurality of fixed channels (23) distributed around the inner circumference of the said casing (2); each said channel (23) having an axis (24) with an intake portion substantially parallel to the said cylindrical helix and an exit portion extending substantially axially with respect to the said tubular casing (2).

4. A drive spindle according to claim 3, wherein the static deflector (17) further comprises a collar (11) fixed within the said tubular casing (2), coaxially thereof; the said tubular body (19) having a cylindrical axial sleeve (25) facing the said motor (3), fitted within the said collar (11) and keyed thereto.

5. A drive spindle according to claim 4, wherein the said collar ( 11) is connected to the said tubular casing (2) by a plurality of radial blades (13), uniformly distributed around the circumference of an inner surface of the said tubular casing (2) and extending axially with respect to the latter.

6. A drive spindle according to claim 3, wherein the said static deflector (17) has two stages (16, 18), a first (18) of the said stages (16, 18) being defined by the said tubular body (19) and by the said associated blades (22), and a second (16) of the said stages (16, 18) being arranged between the first stage (18) and the said motor (3) and including a plurality of further channels (14) extending axially along the said tubular casing (2).

7. A drive spindle according to claim 6, wherein the said channels (23) and the said further channels (14) are offset circumferentially.

8. A drive spindle according to claim 1, wherein the static deflector (17) is located within the said tubular casing (2) and is a two-stage static deflector (16, 18); the said impeller (28) being located between the two stages (16, 18).

9. A drive spindle comprising:
   a tubular casing;
   an electric motor with an output shaft coaxial with the said tubular casing and defining a tool-bearing spindle; and
   a means for cooling the said motor, the said cooling means and the said motor being housed within the said tubular casing with the said cooling means arranged upstream of the said motor; and
   wherein the means for cooling the said motor comprises an impeller coaxial with the said tubular casing and a two-stage static deflector, gradually transforms air flow within the said tubular casing from a substantially helical motion into a substantially axial motion along the said tubular casing.

10. A drive spindle according claim 9, wherein the said impeller is operable to impart to the air inside the said tubular casing a first substantially helical motion along the tubular casing and the said static deflector is operable for gradually transforming the said helical motion into a substantially axial motion along the said tubular casing.

11. A drive spindle comprising:
    a tubular casing (2);
    an electric motor (3) with an output shaft (3a) coaxial with the said tubular casing (2) and defining a tool-bearing spindle; and
    a cooling means (7) for the said motor (3) comprising an impeller (28) coaxial with the said tubular casing (2) and a static deflector (17), the said cooling means (7) and the said motor (3) being housed within the said tubular casing (2) with the said cooling means (7) arranged upstream of the said motor (3);
    wherein the said impeller is operable to impart to the air inside the said tubular casing (2) a first substantially helical motion along the tubular casing (2) and the said static deflector (17) is operable for gradually transforming the said helical motion into a substantially axial motion along the said tubular casing (2);
    wherein the said static deflector (17) comprises a tubular body (19) and a plurality of blades (22) uniformly distributed around the said tubular body (19) and defining with the said tubular casing (2) a plurality of fixed channels (23) distributed around the inner circumference of the said casing (2); each said channel (23) having an axis (24) with an intake portion substantially parallel to the said cylindrical helix and an exit portion extending substantially axially with respect to the said tubular casing (2); and
    and wherein the said static deflector (17) has two stages (16, 18), a first (18) of the said stages (16, 18) being defined by the said tubular body (19) and by the said associated blades (22), and a second (16) of the said stages (16, 18) being arranged between the first stage (18) and the said motor (3) and including a plurality of further channels (14) extending axially along the said tubular casing (2).

* * * * *